Patented Aug. 22, 1944

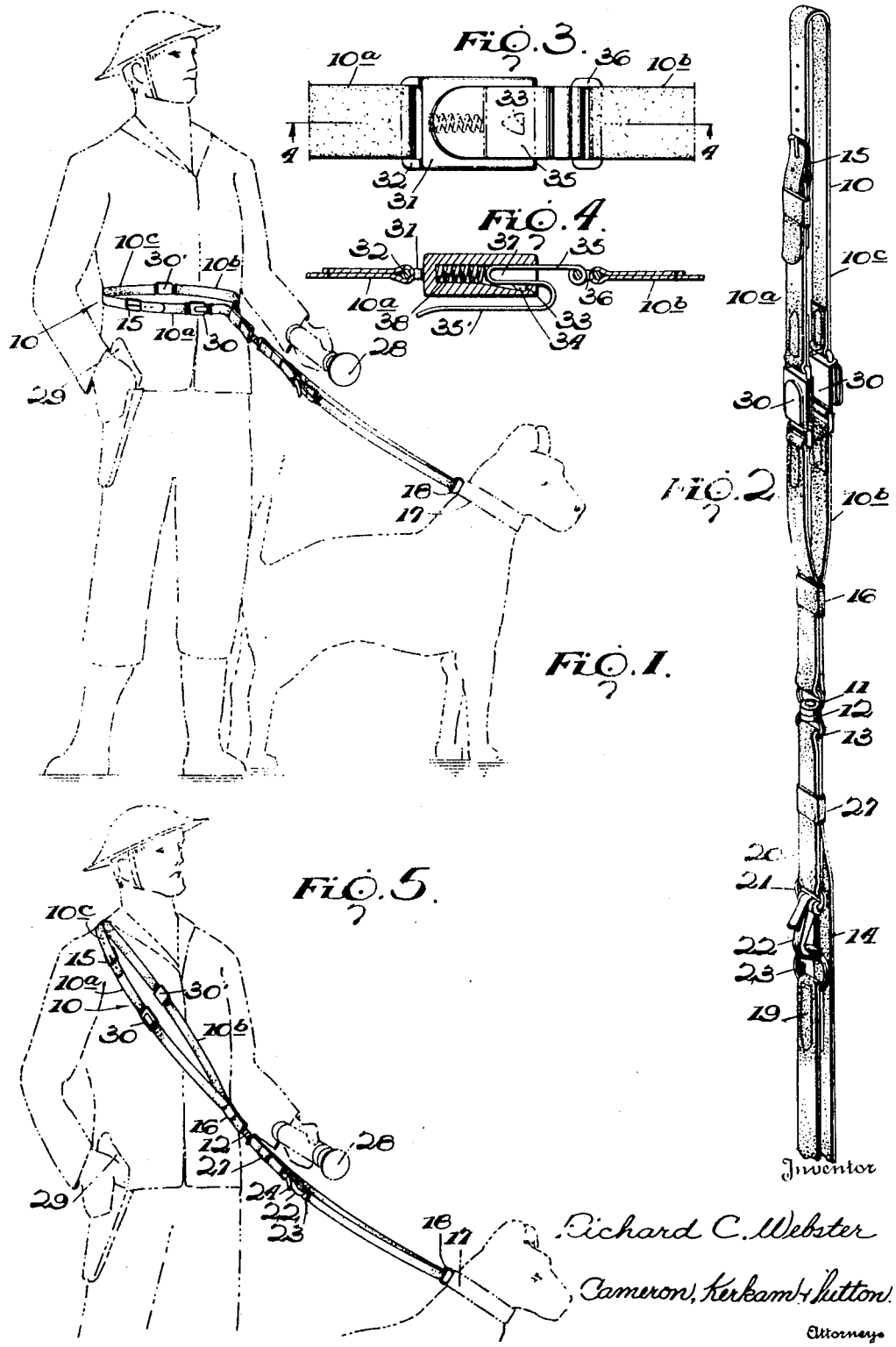

2,356,715

UNITED STATES PATENT OFFICE 2,356,715

LEASH HARNESS

Richard C. Webster, Baltimore, Md., assignor of one-half to Walter A. Parth, New Canaan, Conn.

Application September 17, 1942, Serial No. 458,748

2 Claims. (Cl. 119—109)

The present invention is an improvement in leash harness for animals and particularly dogs which are used by the Army and associated forces in sentry, scouting, patrol, Red Cross and allied work.

In the performance of such work, it is of the first order of importance than the leash be secured to the body of the soldier or attendant and in such manner as not to hamper the performance of his duties; that the soldier or attendant have both hands free for his gun and searchlight or for other objects or purposes; that the construction of leash harness be such that the dog may be released with a minimum of motion by the soldier and without bending or change of position; and that any undesired activity or antics on the part of the dog when on leash shall not tangle the harness or embarrass the soldier. A device meeting these requirements is shown and described in an application of Walter A. Parth, Serial No. 458,749 filed of even date herewith, which has been issued as Patent 2,333,488, dated Nov. 2, 1943.

The present invention is an improvement thereon and consists in means for automatically or involuntarily releasing the dog in the event the soldier or attendant should be killed, or disabled so that he could not consciously or involuntarily release the dog. The provision of this automatic release protects the animal from being choked or injured by the fall of the soldier while freeing the animal for attack or return to post. The automatic or involuntary release operates by the pressure of the soldier's body contacting the ground and is positioned to operate if the soldier falls forward; and I preferably provide a second automatic or involuntary release that operates if the soldier falls backward.

The invention will be understood by reference to the accompanying drawing, illustrating one embodiment of the inventive idea; wherein Fig. 1 illustrates the leash harness, the dog and attendant being shown in dotted lines;

Fig. 2 is a perspective view of the leash harness showing release mechanism on the front and the rear of the belt passing around the body of the attendant;

Fig. 3 is a view in elevation showing one form of release mechanism;

Fig. 4 is a sectional view on the line 4—4 of Fig. 3; and

Fig. 5 is a view similar to Fig. 1 with the belt passing over the right shoulder and under the left arm.

Referring to the drawing, wherein like reference numerals refer to like parts, 10 indicates a body strap or belt which may pass around the waist of the soldier, as in Fig. 1, or over the right shoulder and under the left arm of the soldier, as in Fig. 5. This belt passes through a metal loop 11 which is part of a swivel 12 which latter is also provided with a second loop 13 through which the dog strap or leash 14 passes. The free ends of the body strap or belt 10 are connected in any suitable manner as by a buckle 15, and the belt is adjusted to the body of the wearer by a slip ring 16 of leather or other suitable material.

The dog strap or leash 14 is preferably a single leather strap that has a slip connection with the dog collar 17 as by passing through a ring 18, the ends of the dog strap or leash being preferably looped as at 19 and 20. The loop 20 passes through a metal member 21 on a catch 22 of any suitable construction that detachably engages a metal ring 23 through which the loop 19 passes. The catch 22 is positioned to be operated by a soldier by a simple manipulation without bending or changing the position he may have assumed, in order to release the dog.

The position of the catch 22 is maintained by a slip ring 27, similar to slip ring 16, through which passes that portion of the leash 14 above the catch 22, this position of the catch 22 depending upon the height of the dog and the height and arm length of the soldier. Inasmuch as the soldier or attendant should have his hands free to manipulate a searchlight 28 and his gun 29, or for other objects or purposes, catch 22 is positioned to be manipulated with a minimum of motion and without bending or change of position on the part of the soldier or attendant.

The construction so far described is the invention of Walter A. Parth and is illustrated, described and claimed in an application Serial No. 458,749 filed of even date herewith, which has issued as Patent 2,333,488, dated Nov. 2, 1943.

My invention relates to devices or latches for automatically or involuntarily separating the belt 10 passing around the body of the soldier or attendant in the event of his sudden death or such disability as would prevent him from consciously releasing the dog by manipulation of catch 22. I prefer to provide belt 10 with two latches 30 and 30' which are automatically opened involuntarily by contact with the ground to separate the belt 10. The latch 30 is carried on the front of the belt 10 and would be operated to separate the parts of the belt 10a and 10b should the soldier fall forward. The latch 30' carried on the rear of the belt would be operated to separate parts 10b and 10c of the belt if the soldier fell on his back. While various forms of latches that are automatically releasable by pressure involuntarily applied might be employed, I have shown only one; and inasmuch as both latches, if two are employed, are preferably of the same construction, only one will be described. As shown in detail, in Figs. 3 and 4, part 10a of the belt is connected to a socket member 31 by a loop passing through part 32. This socket member 31 is provided with a shoulder 33 that is engaged by a detent 34 carried by a member 35 which is secured to part 10b of said belt by a loop connection at 36. The member 35 projects into the bore 37 of the socket 31 compressing the spring 38 until the detent 34 engages the shoulder 33 when the parts are in latched position as illustrated in Figs. 3 and 4. The member 35 is preferably of spring metal and is provided with an extension 35' that projects outwardly and across the front of socket 31. Pressure on member 35' will disengage detent 34 from shoulder 33 whereupon spring 38 will force the member 35 out of the bore 37 and thus separate the belt so that the dog will be freed from the body of the soldier or attendant.

While I have herein shown and described a preferred embodiment of the inventive idea, it is to be understood that the latter is susceptible of various mechanical expressions within the limits of the appended claims, particularly in the number and construction of latches automatically releasable by pressure to separate the belt passing around the body of the soldier or attendant and thus freeing the dog.

What is claimed is:

1. An improvement in leash harness comprising a belt passing around the body of the attendant, a dog strap or leash connected to said belt and passing through the dog collar, and a latch carried on the front of said belt, said latch comprising a socket and a flat spring catch, said spring catch having a reversely turned portion extending across the front of the latch, adapted to operate by pressure involuntarily applied by the falling of the attendant to separate the belt and release the dog.

2. An improvement in leash harness comprising a belt passing around the body of the attendant, a dog strap or leash connected to said belt and passing through the dog collar, and a latch carried on the rear of said belt, said latch comprising a socket and a flat spring catch, said spring catch having a reversely turned portion extending across the front of the latch, adapted to operate by pressure involuntarily applied by the falling of the attendant to separate the belt and release the dog.

RICHARD C. WEBSTER.